United States Patent
Li et al.

(10) Patent No.: US 12,103,869 B2
(45) Date of Patent: Oct. 1, 2024

(54) BIOFILM ELECTROCHEMICAL REACTOR FOR SIMULTANEOUSLY REMOVING NITRATE NITROGEN AND TRACE ORGANIC MATTERS IN WATER

(71) Applicant: QINGDAO UNIVERSITY OF TECHNOLOGY, Shandong (CN)

(72) Inventors: Jincheng Li, Shandong (CN); Wenxiang Xia, Shandong (CN); Yanyan Wang, Shandong (CN); Xiaoting Yang, Shandong (CN); Baoxiu Zhao, Shandong (CN); Jie Liu, Shandong (CN); Xiaoli Zhao, Shandong (CN)

(73) Assignee: QINGDAO UNIVERSITY OF TECHNOLOGY

( * ) Notice: Subject to any disclaimer, the term of this patent is extended or adjusted under 35 U.S.C. 154(b) by 422 days.

(21) Appl. No.: 17/272,670

(22) PCT Filed: Jan. 19, 2020

(86) PCT No.: PCT/CN2020/072930
§ 371 (c)(1),
(2) Date: Mar. 2, 2021

(87) PCT Pub. No.: WO2020/215846
PCT Pub. Date: Oct. 29, 2020

(65) Prior Publication Data
US 2022/0033286 A1   Feb. 3, 2022

(30) Foreign Application Priority Data
Apr. 25, 2019   (CN) .......................... 201910338870.2

(51) Int. Cl.
*C02F 3/00*   (2023.01)
*C02F 1/461*   (2023.01)
(Continued)

(52) U.S. Cl.
CPC ........ *C02F 1/46109* (2013.01); *C02F 1/4618* (2013.01); *C02F 3/005* (2013.01);
(Continued)

(58) Field of Classification Search
CPC ...... C02F 3/005; C02F 1/461; C02F 2203/00; C02F 2203/002; C02F 2203/004; C02F 2203/006; C02F 1/283; H01M 8/16
See application file for complete search history.

(56) References Cited

U.S. PATENT DOCUMENTS

2012/0132521 A1   5/2012   Silver et al.
2013/0112601 A1*   5/2013   Silver .................... C02F 3/025
                                                210/243

FOREIGN PATENT DOCUMENTS

CN   1403389 A   3/2003
CN   103304038 A   9/2013
(Continued)

OTHER PUBLICATIONS

Liang et al., "Scaling up a novel denitrifying microbial fuel cell with an oxic-anoxic two stage biocathode", Oct. 17, 2013, Frontiers in Environmental Science and Engineering, 7, 913. (Year: 2013).*
Hu, Chuanxia et al. "Study on Removal of Nitrate from by Secondary Effluent Immobilized Three-dimension Electrode-biofilm Reactor". Environmental Science & Technology. Feb. 10, 2008 (Feb. 10, 2008). vol. 31. No. 2. pp. 83-87.
(Continued)

*Primary Examiner* — Luan V Van
*Assistant Examiner* — Andrew Koltonow
(74) *Attorney, Agent, or Firm* — Jose Cherson Weissbrot

(57) ABSTRACT

The application belongs to the technical field of water treatment, and relates to a biofilm electrochemical reactor for simultaneously removing nitrate nitrogen and trace organic matters in water. According to the principles of electrochemical reaction and products completely different under different cathode and anode material conditions, the reactor is divided into three functional regions, wherein first, an electrochemical reaction of producing hydrogen at a (Continued)

cathode and decomposing carbon at an anode is realized in a first functional region so as to provide a condition for reduction of nitrate nitrogen by a hydrogen autotrophic denitrifying bacteria of a particle electrode layer in a second functional region, after products generated by means of the electrochemical reaction and a biochemical reaction in the previous two functional regions enter a third functional region, pollutants such as trace organic components and residual ammonia nitrogen in water are oxidized and decomposed by using anodic oxidation function.

9 Claims, 2 Drawing Sheets

(51) Int. Cl.
  *C02F 3/20* (2023.01)
  *C02F 101/16* (2006.01)
  *C02F 101/30* (2006.01)
(52) U.S. Cl.
  CPC .... *C02F 3/202* (2013.01); *C02F 2001/46185* (2013.01); *C02F 2101/163* (2013.01); *C02F 2101/30* (2013.01)

(56) References Cited

FOREIGN PATENT DOCUMENTS

| CN | 104118933 A | 10/2014 |
| CN | 105130124 A | 12/2015 |
| CN | 105417901 A | 3/2016 |
| CN | 105859054 A | 8/2016 |
| CN | 106630117 A | 5/2017 |
| CN | 106986440 A | 7/2017 |
| CN | 109928584 A | 6/2019 |
| CN | 110156146 A | 8/2019 |
| EP | 2952483 A1 | 12/2015 |
| JP | H0686982 A | 3/1994 |
| JP | H11300361 A | 11/1999 |
| JP | 5347221 B2 | 11/2013 |
| KR | 20090104470 A | 10/2009 |

OTHER PUBLICATIONS

Liu, Junfeng. "Nitrate nitrogen and TOC removal from groungwater by a three-bioelectrochemical reactor". Wanfang Dissertation. Jun. 15, 2015 (Jun. 15, 2015).

Minghua Zhou et al. "Enhancement onthe simultaneousremoval of nitrateand organicpollutants". Bioresource Technology. May 24, 2009 (May 24, 2009). vol. 100. No. 20. pp. 4662-4668.

* cited by examiner

BIOFILM ELECTROCHEMICAL REACTOR FOR SIMULTANEOUSLY REMOVING NITRATE NITROGEN AND TRACE ORGANIC MATTERS IN WATER

CROSS REFERENCE TO RELATED APPLICATIONS

This application is a national application of PCT/CN2020072930, filed on Jan. 19, 2020. The contents of PCT/CN2020072930 are all hereby incorporated by reference.

TECHNICAL FIELD

The application belongs to a technical field of water treatment, and relates to water treatment equipment comprising multifunctional combination of electrochemical oxidation, microbial autotrophic denitrification, hydrolysising to produce hydrogen and activated carbon adsorption, in particular to a biofilm electrochemical reactor for simultaneously removing nitrate nitrogen and trace organic matters in water. A combined three-dimensional biofilm electrochemical reactor is constructed by filling activated carbon, which can effectively remove nitrate nitrogen and trace organic matter in micro-polluted water sources at the same time.

BACKGROUND

Because of the large discharge of industrial wastewater and urban sewage, the water source has been seriously polluted, and water sources with excessive nitrate nitrogen content are often accompanied by excessive concentrations of trace organic matter, making it more difficult to purify the water quality of such water sources, and causing more lasting negative effects on human health and industrial and agricultural production.

At present, the main treatment technologies of the micro-polluted water source are as follows: physicochemical method, biological method, bioelectrochemical method and the like. Physicochemical methods comprise adsorption method, coagulation precipitation method and membrane separation method, in which adsorption can only transfer micro-pollutants without decomposing and eliminating them; The coagulation precipitation method is to aggregate colloid and fine suspended matters in water into floc by adding coagulant, and then to carry out solid-liquid separation through precipitation, so that secondary pollution is often introduced; the membrane separation method has the defects of high cost, high energy consumption and poor selectivity. The biological treatment technology utilizes the metabolism of microorganisms to convert organic pollutants and nitrate nitrogen in water into inorganic $CO_2$, $H_2O$ and $N_2$ to achieve the purpose of purification, but because the concentration of organic matters and nitrate nitrogen in the micro-polluted water source is low, the single biological treatment technology has low efficiency and poor effect, and the refractory organics in the water can inhibit the activity of microorganisms, this makes the biological treatment process difficult to operate efficiently. Biofilm electrochemical method is a new type of groundwater treatment technology in recent years with high selectivity and good treatment effect, which is based on the electrochemical technology, introducing the biofilm into the electrode surface to form the biofilm electrode, and using the combination of electrochemical electron transfer and biological oxidation.

Early biofilm electrochemical reactors were mainly used to remove nitrate nitrogen from water. The principle is that hydrogen is produced by a cathode, hydrogen autotrophic denitrifying bacteria are formed by inoculating in the cathode region, and nitrate nitrogen is reduced to nitrogen through denitrification. Such reactors are typically packed with granular activated carbon between cathode and anode electrodes to form a three-dimensional biofilm electrochemical reactor (3D-BER). However, the current research and application mainly focus on the removal of nitrate nitrogen in water, usually only the reduction of cathode is considered, but the oxidation of anode is not considered, which makes the electrical efficiency of the conventional 3D-BER reactor low, and cannot effectively combine the oxidation removal of organic matter by the anode with the denitrification of nitrate nitrogen by the biofilm cathode, especially in the case of complex polluted water source, the reactor cannot synchronously remove nitrate nitrogen and trace organic matters in water, and the existing research results rarely carry out deep research on the structure of the bioelectrochemical reactor.

SUMMARY

Technical Problem

The application aims to overcome the defects in the prior art, designs and provides a biofilm electrochemical reactor for simultaneously removing nitrate nitrogen and trace organic matters in water, and simultaneously plays the roles of anodic oxidation and cathodic reduction, so that the synchronous integrated treatment of nitrate nitrogen and trace organic matters in underground water is realized.

In order to achieve the purpose, in the application, the main structure of the biofilm electrochemical reactor comprises a reactor, a first anode, activated carbon fillers, a first cathode, stainless steel electrode rods, a filler adding hole, a second cathode, a second anode, an automatic exhaust valve, a power supply, voltage regulators, a water distributor, a return valve, a water inlet pipe, a water outlet pipe, a return pipe and a water outlet valve; the outer shell of the reactor is made of glass fiber reinforced plastic, the reactor is internally divided into three functional regions consisting of a first functional region, a second functional region and a third functional region, wherein the first functional region and the third functional region are two independent biofilm electrochemical reaction regions, the lower part and the upper part of the first functional region are correspondingly provided with the first anode and the first cathode which are both of flat plate structures, and the lower part and the upper part of the third functional region are correspondingly provided with the second cathode and the second anode which are both of flat plate structures; the first cathode and the second cathode are connected in parallel and are connected with the negative electrode of the power supply through wires, the first anode and the second anode are connected in parallel and are connected with the positive electrode of the power supply through wires, and the voltage regulators are arranged between the first anode and the power supply and between the second anode and the power supply, and are respectively used for regulating the voltages of the first functional region and the third functional region; the second functional region is a three-dimensional biofilm cathode, stainless steel electrode rods with a diameter of 5 mm are vertically and uniformly arranged on the surface of the first cathode so as to increase the contact area with the activated carbon filler and increase the space efficiency of the cathode, by inoculating autotrophic denitrifying bacteria in the second functional region, and utilizing the hydrogen production of the three-dimensional biofilm cathode and an inorganic carbon source generated by the first anode of the first functional region, the autotrophic denitrifying bacteria denitrifies; the activated carbon fillers are filled in the three functional regions, the activated carbon fillers are filled through filler adding holes arranged on the right side of each functional region, the activated carbon fillers are in contact with a lower electrode, and the distance between the activated carbon fillers and an upper electrode is 2-5 cm; the automatic exhaust valve is vertically arranged on a water outlet pipe at the top of the reactor and used for removing residual gas generated in the reactor, and a water outlet valve is arranged at the end part of the water outlet pipe; and the water outlet pipe is communicated with the return pipe, part of the outlet water is returned to the bottom of the reactor by the return pipe, the return pipe is communicated with the water inlet pipe at the bottom of the reactor, the return pipe is provided with the return valve for controlling close to the water inlet pipe, and the bottom of the reactor is provided with the water distributor connected with the water inlet pipe.

In some embodiments of the application, the first anode is made of a graphite material, generates soluble $CO_2$ through electrode reaction, and provides the inorganic carbon source for autotrophic denitrifying bacteria added to the second functional region; at the same time, a small amount of $O_2$ generated in the first anode is used and removed by the microbial absorption on the activated carbon filler in the first functional region.

In some embodiments of the application, the second anode is made of a titanium plate with a catalytic oxidation function or a titanium mesh plated with ruthenium oxide, is used for catalyzing the anode, and generates oxidation free radicals through electrode reaction to degrade trace organic matters in water.

In some embodiments of the application, the activated carbon fillers are fruit shell activated carbon with the particle size of 2-4 mm, on one hand, impurities in water are removed through adsorption filtration, on the other hand, particle electrodes are formed through polarization of an electric field and assist electrochemical removal of nitrate and organic matters.

In some embodiments of the application, the first functional region is a pre-oxidation and carbon production region, the first cathode at the upper part is made of a stainless steel mesh, the upper part of the first anode is filled with the activated carbon fillers to form a three-dimensional anode structure, and the anode reaction in the first functional region is as follows: $C+2H_2O=CO_2+4H^++4e$, $H_2O=\frac{1}{2}O_2+2H^++2e$;

the cathode reaction is as follows: $2H_2O+2e=H_2+2OH^-$; and the aerobic degradation reaction is $C_6H_5OH+7O_2=6CO_2+3H_2O$.

In some embodiments of the application, the second functional region is a hydrogen autotrophic denitrification region, the second functional region consists of the second cathode at the upper part and the activated carbon fillers, the second cathode is made of a stainless steel mesh, the stainless steel electrode rods extending to the activated carbon filler layer are arranged on the surface of the second cathode, so that the contact area of the stainless steel electrode rods and the activated carbon is increased, and the contact and the electron transfer area between the second cathode and the autotrophic denitrification bacteria on the surface of the activated carbon fillers are increased. The reactions in the second functional region are: $2NO_3^-+5H_2=N_2+4H_2O+2OH^-$; $2H_2O+2e=H_2+2OH^-$.

In some embodiments of the application, the third functional region is a trace organic matter removal region and an oxygen generation region, the second cathode is below and the second anode is above, and with the action of an electric field, the surface of the second anode is discharged to generate ·OH with strong oxidation effect, which can quickly oxidize to remove some trace organic pollutants in water, and the other trace organic pollutants are removed by the adsorption and degradation effects of the biofilm loaded on the activated carbon fillers; the anode reaction occurring in the third functional region is: $C_6H_5O+RuO_2(\cdot OH)= 6CO_2+RuO_2+H^++e^-$; the cathode reaction is as follows: $2H_2O+2e=H_2+2OH^-$; the denitrification reaction is $2NO_3^-+5H_2=N_2+4H_2O+2OH^-$.

In the application, through an inoculation and domestication process, a layer of biofilm composed of autotrophic denitrifying bacteria is formed on the surface of the activated carbon filler layers of the second cathode in the second functional region, and an autotrophic denitrifying reaction is carried out by utilizing hydrogen generated by electrochemical reaction and an inorganic carbon source generated by the anode reaction in the first functional region to remove nitrate nitrogen in water; The whole reactor controls the hydrogen production amount of the reactor by adjusting the current intensity, thereby controlling the denitrification reaction.

The power supply provided by some embodiments of the application is a 24 V direct current power supply converted from a voltage of 220 V, and is applied to two groups of positive and negative electrodes of a first functional region and a third functional region of a reactor to form an electrochemical reactor.

In some embodiments of the application, the specific process for simultaneously removing nitrate nitrogen and trace organic matters in water is as follows:

(1) reactor start: the reactor needs to be started before operation, and hydrogen autotrophic denitrifying bacteria are inoculated into the reactor. The inoculation process is: placing the cultured autotrophic denitrifying bacteria solution in a bacteria solution box for sealed storage, sequentially connecting to the bottom of a reactor through an inoculation pump and a water inlet valve, closing the water outlet valve, opening a return valve, opening the inoculation pump for cyclic inoculation, simultaneously opening a power supply, adjusting the voltage of the reactor to be 24 V, removing the bacteria solution box and the inoculation pump 48 h after cyclic inoculation, and connecting a water inlet pipe to the water inlet valve;

(2) reactor operation: after inoculation in the reactor is finished, the reactor enters an operation state, a water inlet valve and a water outlet valve are opened, a return valve is adjusted, micro-polluted raw water enters the lower part of the reactor, water flows upwards from bottom to top in the reactor. Perform electrochemical pretreatment in the first functional region to remove part of ammonia nitrogen and organic matter, then enter the second functional region to remove nitrate nitrogen in the water by autotrophic denitrifying bacteria, and finally enter the third functional region to oxidize and remove trace organic matter in the water. A part of outlet water is discharged through the water outlet valve at the top of the reactor, the other part of outlet water is returned to the lower part of the reactor again through the return valve to be mixed with micro-polluted raw water, then uniformly distributed to the bottom of the reactor through the water distributor, backflow can buffer the water quality of the inlet water, gas generated by the reactor is discharged through the automatic exhaust valve, voltage in the whole operation process is supplied by a power supply and regulated with the voltage regulator; controlling the hydraulic retention time of the reactor to be 8-10 h, the current intensity to be 20-40 mA, the pH value of micro-polluted raw water to be 6-8, and the nitrate nitrogen concentration to be 20-40 mg/L in the operation process; and (3) reactor maintenance: after the reactor is operated for one year, the activated carbon fillers and electrodes need to be replaced, the activated carbon filler of the reactor is supplemented and replaced through the filler adding hole, and the electrodes of the reactor are replaced through the electrode mounting flange.

In some embodiments of the application, a cultivation process of the autotrophic denitrifying bacteria solution is: stirring 150 L of activated sludge from the denitrification section of a wastewater treatment plant for 15 min with a 160 r/min stirrer, then standing for 10 min to precipitate, taking 100 L of supernatant, then repeating the stirring and the precipitation operation for three times to obtain 50 L of bacterial solution, and then diluted 1 time with 0.8% NaCl solution to prepare autotrophic denitrification bacterial solution required for inoculation.

Before the micro-polluted raw water of some embodiments of the application enters the bottom of the reactor, the micro-polluted raw water is firstly mixed with a part of the outlet water of the reactor, the mixing ratio is controlled through the return valve, part of oxygen and carbonate can be contained in the return water, the anodic oxidation of a first functional region is facilitated, the reaction pH of an electrode can be buffered, and the current efficiency is improved. The micro-polluted raw water enters the bottom of the reactor in a reverse flow mode and flows from bottom to top, the micro-polluted raw water is uniformly distributed to the bottom of the first functional region through the water distributor, and passes through a anode of the first functional region at a constant speed upwards.

In the application, the removal process and mechanism of nitrate nitrogen and trace organic matters in the water source are different, wherein the removal of nitrate nitrogen needs to be completed by utilizing the electrochemical hydrogen production of a biofilm cathode in cooperation with the biological action of autotrophic denitrifying bacteria, and the removal of trace organic matters is mainly achieved through anodic oxidation. According to the principles of electrochemical reaction and products completely different under different cathode and anode material conditions, the reactor is divided into three functional regions, wherein first, an electrochemical reaction of producing hydrogen at a cathode and decomposing carbon at an anode is realized in the first functional region, so as to provide a condition for the reduction of nitrate nitrogen by a hydrogen autotrophic denitrifying bacteria of a particle electrode layer in the second functional region, after products generated by means of the electrochemical reaction and a biochemical reaction in the previous two functional regions enter the third functional region, pollutants such as trace organic components and residual ammonia nitrogen in water are oxidized and decomposed by using an anodic oxidation function so as to realize the purpose of comprehensive treatment. The chemical reactions in the three functional regions are different, and the electrode materials can also be replaced according to requirements, thereby realizing the purpose of efficiently removing different types of trace organic matters in raw water.

Compared with the prior art, the application has the following advantages: firstly, the novel structure makes the anodic oxidation effect and the cathodic reduction effect work at the same time, so that nitrate nitrogen and trace organic matters of micro-polluted underground water are simultaneously removed in the same reactor; secondly, the activated carbon is used as a particle electrode, and the treatment effect of the micro-polluted underground water is improved; thirdly, a combined structure of different anodes is adopted for the first time, so that one reactor has different functional regions, and the problem of simultaneously removing different pollutants in a water source is solved; and fourthly, a novel three-dimensional multi-needle structure is adopted for the cathode in the second functional region, so that the electrochemical effect of the biofilm cathode is improved.

Solution to the Problem

Beneficial Effects of the Application

THE BEST EMBODIMENT FOR IMPLEMENTING THE APPLICATION

Detailed Description of the Embodiments

Figure 1:
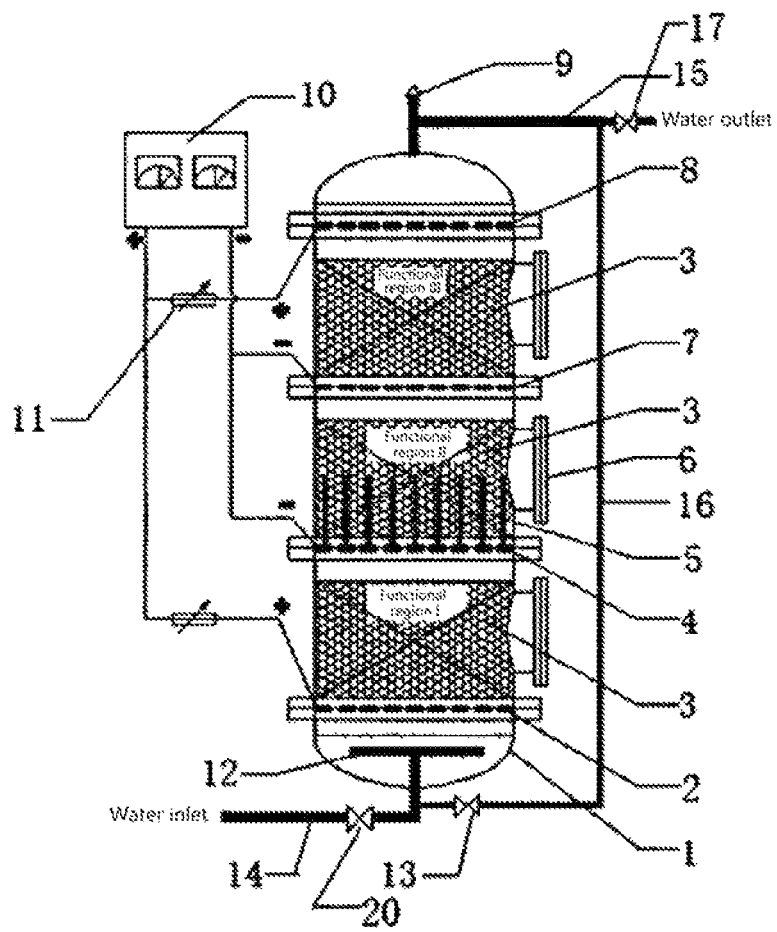
FIG. 1 is a schematic view showing a principle of a main body structure of a biofilm electrochemical reactor of some embodiments of the application.
Figure 2:
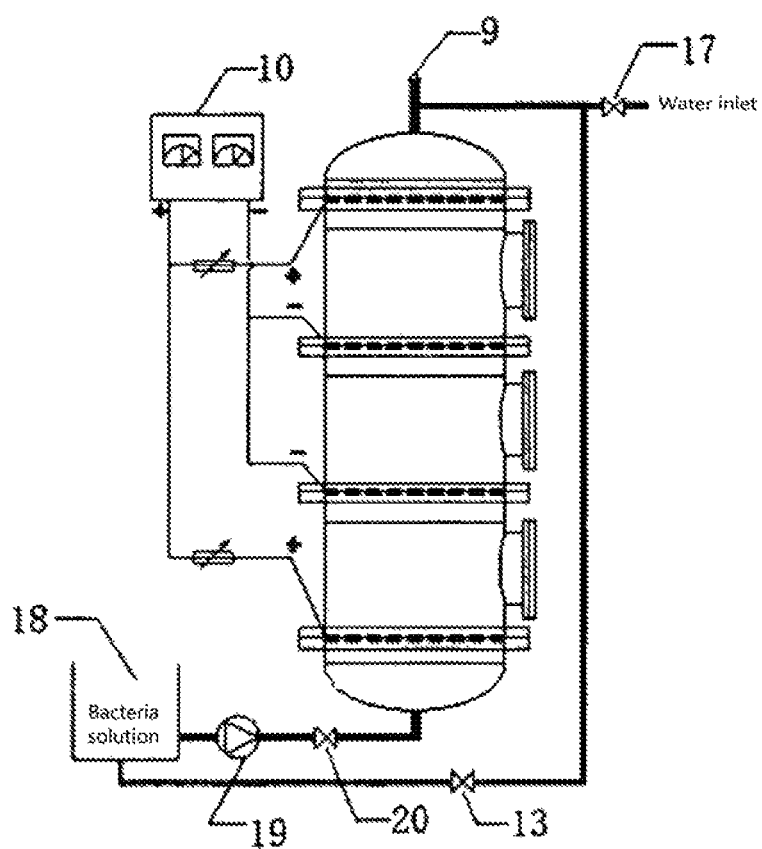
FIG. 2 is a schematic diagram showing the inoculation principle of the hydrogen autotrophic denitrifying bacteria of some embodiments of the application.

The application will now be further described, by way of embodiment, with reference to the drawings.

EMBODIMENTS

In the embodiment, the main structure of the biofilm electrochemical reactor comprises a reactor 1, a first anode 2, activated carbon fillers 3, a first cathode 4, stainless steel electrode rods 5, a filler adding hole 6, a second cathode 7, a second anode 8, an automatic exhaust valve 9, a power supply 10, voltage regulators 11, a water distributor 12, a return valve 13, a water inlet pipe 14, a water outlet pipe 15, a return pipe 16 and a water outlet valve 17; the outer shell of the reactor 1 is made of glass fiber reinforced plastic, the reactor 1 is internally divided into three functional regions consisting of a first functional region I, a second functional region II and a third functional region III, wherein the first functional region I and the third functional region III are two independent biofilm electrochemical reaction regions, the lower part and the upper part of the first functional region I are correspondingly provided with a first anode 2 and a first cathode 4 which are both of flat plate structures, and the lower part and the upper part of the third functional region III are correspondingly provided with a second cathode 7 and a second anode 8 which are both of flat plate structures; the first cathode 4 and the second cathode 7 are connected in parallel and are connected with the negative electrode of the power supply 10 through wires, the first anode 2 and the second anode 8 are connected in parallel and are connected with the positive electrode of the power supply 10 through wires, and the voltage regulators 11 are arranged between the first anode 2 and the power supply 10 and between the second anode 8 and the power supply 10, and are respectively used for regulating the voltages of the first functional region I and the third functional region III; the second functional region II is a three-dimensional biofilm cathode, stainless steel electrode rods 5 with a diameter of 5 mm are vertically and uniformly arranged on the surface of the first cathode 4 so as to increase the contact area with the activated carbon fillers 3 and increase the space efficiency of the cathode, autotrophic denitrifying bacteria are inoculated into the second functional region II, and the autotrophic denitrifying bacteria denitrifies by utilizing the hydrogen production of the three-dimensional biofilm cathode and an inorganic carbon source generated by the first anode 2 of the first functional region I; activated carbon fillers 3 are filled in the three functional regions, the activated carbon fillers 3 are filled through filler adding holes 6 arranged on the right side of each functional region, the activated carbon fillers are in contact with the lower electrode, and the distance between the activated carbon fillers 3 and an upper electrode is 2-5 cm; the automatic exhaust valve 9 is vertically arranged on a water outlet pipe 15 at the top of the reactor 1 and used for removing residual gas generated in the reactor 1, and a water outlet valve 17 is arranged at the end part of the water outlet pipe 15; and the water outlet pipe 15 is communicated with the return pipe 16, part of the outlet water is returned to the bottom of the reactor 1 by the return pipe 16, the return pipe 16 is communicated with the water inlet pipe 14 at the bottom of the reactor 1, the return pipe 16 is provided with the return valve 13 for controlling close to the water inlet pipe 14, and the bottom of the reactor 1 is provided with the water distributor 12 connected with the water inlet pipe 14.

In the embodiment, the first anode 2 is made of a graphite material, generates soluble $CO_2$ through electrode reaction, and provides the inorganic carbon source for autotrophic denitrifying bacteria added into the second functional region II; at the same time, a small amount of $O_2$ generated at the first anode 2 is utilized and removed by microbial absorption on the activated carbon filler 3 in the first functional region I.

The second anode 8 in the embodiment is made of a titanium plate with a catalytic oxidation function or a titanium mesh plated with ruthenium oxide, is used for catalyzing the anode, and generates oxidation free radicals through electrode reaction to degrade trace organic matters in water.

In the embodiment, the activated carbon fillers 3 is fruit shell activated carbons with the particle size of 2-4 mm, on one hand, impurities in water are removed through adsorption filtration, on the other hand, particle electrodes are formed through polarization of an electric field to assist electrochemical removal of nitrate and organic matters.

In the embodiment, the first functional region I is a pre-oxidation and carbon production region, the first cathode 4 at the upper part is made of a stainless steel mesh, the upper part of the first anode 2 is filled with the activated carbon fillers 3 to form a three-dimensional anode structure, and the anode reaction in the first functional region I is as follows: $C+2H_2O=CO_2+4H^++4e$, $H_2O=\frac{1}{2}O_2+2H^++2e$;

The cathode reaction is as follows: $2H_2O+2e=H_2+2OH^-$; and the aerobic degradation reaction is $C_6H_5OH+7O_2=6CO_2+3H_2O$.

In the embodiment, the second functional region II is a hydrogen autotrophic denitrification region, the second functional region II consists of a second cathode 7 at the upper part and activated carbon fillers 3, the second cathode 7 is made of a stainless steel mesh, and stainless steel electrode rods 5 extending to the activated carbon fillers layer are arranged on the surface of the second cathode 7 so as to increase the contact area of the stainless steel electrode rods and the activated carbon and increase the contact area and the electron transfer area of the second cathode 7 and the autotrophic denitrification bacteria on the surface of the activated carbon; the reactions occurring in the second functional region II are: $2NO_3^-+5H_2=N_2+4H_2O+2OH^-$; $2H_2O+2e=H_2+2OH^-$.

In the embodiment, the third functional region III is a trace organic matter removal region and an oxygen generation region, the second cathode 7 is arranged below, the second anode 8 is arranged above, and with the action of an electric field, the surface of the second anode 8 is discharged to generate ·OH with a strong oxidation effect, so that a part of trace organic pollutants in water can be rapidly oxidized and removed, and the other part of trace organic pollutants are removed through the biofilm adsorption and degradation effects loaded on the activated carbon fillers 3; the anode reaction occurring in the third functional region III is: $C_6H_5O+RuO_2(·OH)=6CO_2+RuO_2+H^++e^-$; the cathode reaction is as follows: $2H_2O+2e=H_2+2OH^-$; the denitrification reaction is $2NO_3^-+5H_2=N_2+4H_2O+2OH^-$.

In the embodiment, through an inoculation and domestication process, a layer of biological film composed of autotrophic denitrifying bacteria is formed on the surface of the activated carbon filler layer of the second cathode 7 in the second functional region II, and the autotrophic denitrifying reaction is carried out by utilizing hydrogen generated by electrochemical reaction and an inorganic carbon source generated by anode reaction of the first functional region I to remove nitrate nitrogen in water; The whole reactor controls the hydrogen production amount of the reactor by adjusting the current intensity, thereby controlling the denitrification reaction.

The power supply 10 described in the embodiment is a 24V direct current power supply converted from 220V voltage and applied to the two sets of positive and negative electrodes in the first functional region I and the third functional region III of the reactor to form an electrochemical reactor.

The specific process for simultaneously removing nitrate nitrogen and trace organic matters in water in the embodiment is:

(1) reactor start: the reactor needs to be started before operation, and hydrogen autotrophic denitrifying bacteria are inoculated into the reactor. The inoculation process is: placing the cultured autotrophic denitrifying bacteria solution in a bacteria solution box 18 for sealed storage, sequentially connecting to the bottom of a reactor through an inoculation pump 19 and a water inlet valve 20, closing the water outlet valve 17, opening the return valve 13, opening the inoculation pump for cyclic inoculation, simultaneously opening a power supply 10, adjusting the voltage of the reactor to be 24 V, removing the bacteria solution box 18 and the inoculation pump 19 48 h after cyclic inoculation, and connecting a water inlet pipe 14 to the water inlet valve 20;

(2) reactor operation: after inoculation in the reactor is finished, the reactor enters an operation state, a water inlet valve 20 and a water outlet valve 17 are opened, a return valve 13 is adjusted, micro-polluted raw water enters the lower part of the reactor, water flows upwards from bottom in the reactor. Perform electrochemical pretreatment in the first functional region I to remove part of ammonia nitrogen and organic matter, then enter the second functional region II to remove nitrate nitrogen from the water by autotrophic denitrifying bacteria, and finally enter the third functional region III to oxidize and remove trace organic matter in the water. A part of outlet water is discharged through the water outlet valve 17 at the top of the reactor, the other part of outlet water is returned to the lower part of the reactor again through the return valve 13 to be mixed with micro-polluted raw water, then uniformly distributed to the bottom of the reactor through the water distributor 12, backflow can buffer the water quality of the inlet water, gas generated by the reactor is discharged through the automatic exhaust valve 9, voltage in the whole operation process is supplied by the power supply 10 and regulated through the voltage regulator 11; controlling the hydraulic retention time of the reactor to be 8-10 h, the current intensity to be 20-40 mA, the pH value of micro-polluted raw water to be 6-8, and the nitrate nitrogen concentration to be 20-40 mg/L In the operation process; and (3) reactor maintenance: after the reactor is operated for about one year, the activated carbon fillers and the electrodes need to be replaced, the activated carbon filler of the reactor is supplemented and replaced through the filler adding hole 6, and the electrodes of the reactor are replaced through the electrode mounting flange.

In the embodiment, the cultivation process of the autotrophic denitrifying bacteria solution is: stirring 150 L of activated sludge from the denitrification section of a wastewater treatment plant for 15 min with a 160 r/min stirrer, then standing for 10 min to precipitate, taking about 100 L of supernatant, then repeating the stirring and the precipitation operation for three times to obtain about 50 L of bacterial solution, and then diluted 1 time with 0.8% NaCl solution to prepare autotrophic denitrification bacterial solution required for reactor inoculation.

Before the micro-polluted raw water of the embodiment enters the bottom of the reactor, the micro-polluted raw water is firstly mixed with a part of the outlet water of the reactor, the mixing ratio is controlled through the return valve 13, part of oxygen and carbonate can be contained in the return water, the anodic oxidation of a first functional region I is facilitated, the reaction pH of an electrode can be buffered, and the current efficiency is improved. The micro-polluted raw water enters the bottom of the reactor in a reverse flow mode and flows from bottom to top, the micro-polluted raw water is uniformly distributed to the bottom of the first functional region I through the water distributor 12, and passes through the anode of the first functional region I at a constant speed upwards.

In the embodiment, the bio-electrochemical reactor is used for treating a simulated micro-polluted underground water in Shandong, the main micro-polluted substances in the water are nitrate and phenol ($C_6H_6O$), and the water quality of the underground water before treatment is shown in table 1,

TABLE 1

| main components of raw water quality | Content (mg/L) | Main Components | Content |
|---|---|---|---|
| $MgCl_2$ | 158.0 | $NO_3$—N | 30 mg/L (in N) |
| $K_2HPO_4$ | 8.5 | $C_6H_6O$ | about 0.05 mg/L |
| $NaHCO_3$ | 131.0 | DO | 0.4-5.0 mg/L |
| $FeSO_4$ | 1.0 | pH | 7.07 |

The reactor was operated under the conditions of hydraulic retention time 10 h, current intensity 40 mA, influent pH 6.5-7.1, influent nitrate nitrogen concentration 30 mg/L, influent phenol concentration 0.05 mg/L. The concentration of nitrate nitrogen in reactor effluent was less than 10 mg/L, and phenol concentration in effluent was less than 0.002 mg/L, which indicates that the bio-electrochemical reactor can effectively remove nitrate nitrogen and trace phenol organic matter from the micro-polluted groundwater at the same time.

What is claimed is:

1. A biofilm electrochemical reactor for simultaneously removing nitrate nitrogen and trace organic matters in water, wherein a main structure comprises a reactor, an upper electrode including a first anode and a second anode, activated carbon fillers, a lower electrode including a first cathode and a second cathode, stainless steel electrode rods, a filler adding hole, an automatic exhaust valve, a power supply, voltage regulators, a water distributor, a return valve, a water inlet pipe, a water outlet pipe, a return pipe and a water outlet valve; an outer shell of the reactor is made of glass fiber reinforced plastic, the reactor is internally divided into three functional regions consisting of a first functional region, a second functional region and a third functional region, wherein the first functional region and the third functional region are two independent biofilm electrochemical reaction regions, a lower part and an upper part of the first functional region are correspondingly provided with the first anode and the first cathode which are both of flat plate structures, and a lower part and an upper part of the third functional region are correspondingly provided with the second cathode and the second anode which are both of flat plate structures; the first cathode and the second cathode are connected in parallel and are connected with a negative electrode of the power supply through wires; the first anode and the second anode are connected in parallel and are connected with a positive electrode of the power supply through wires, and the voltage regulators are arranged between the first anode and the power supply and between the second anode and the power supply, and are respectively used for regulating voltages of the first functional region and the third functional region; the second functional region is a three-dimensional biofilm cathode, the stainless steel electrode rods with a diameter of 5 mm are vertically and uniformly arranged on a surface of the first cathode so as to increase a contact area with the activated carbon filler and increase a space efficiency of the first cathode, by inoculating autotrophic denitrifying bacteria in the second functional region, and utilizing hydrogen production of the three-dimensional biofilm cathode and an inorganic carbon source generated by the first anode of the first functional region, the autotrophic denitrifying bacteria denitrifies; the activated carbon fillers are filled in the three functional regions, the activated carbon fillers are filled through filler adding holes arranged on a right side of each functional region, the activated carbon fillers are in contact with the lower electrode, and the distance between the activated carbon fillers and the upper electrode is 2-5 cm; the automatic exhaust valve is vertically arranged on the water outlet pipe at the top of the reactor and used for removing residual gas generated in the reactor, and the water outlet valve is arranged at an end part of the water outlet pipe; and the water outlet pipe is communicated with the return pipe, part of outlet water is returned to the bottom of the reactor by the return pipe, the return pipe is communicated with the water inlet pipe at the bottom of the reactor, the return pipe is provided with the return valve for controlling close to the water inlet pipe, and the bottom of the reactor is provided with the water distributor connected with the water inlet pipe.

2. The biofilm electrochemical reactor for simultaneously removing nitrate nitrogen and trace organic matters in water of claim 1, wherein the first anode is made of a graphite material, generates soluble $CO_2$ through electrode reaction, and provides the inorganic carbon source for the autotrophic denitrifying bacteria added to the second functional region; at the same time, a small amount of $O_2$ generated in the first anode is used and removed by the microbes absorbed on the activated carbon filler in the first functional region.

3. The biofilm electrochemical reactor for simultaneously removing nitrate nitrogen and trace organic matters in water of claim 1, wherein the second anode is made of a titanium plate with a catalytic oxidation function or a titanium mesh plated with ruthenium oxide, is used for catalyzing the anode, and generates oxidation free radicals through electrode reaction to degrade trace organic matters in water.

4. The biofilm electrochemical reactor for simultaneously removing nitrate nitrogen and trace organic matters in water of claim 1, wherein the activated carbon fillers are fruit shell activated carbons with a particle size of 2-4 mm, whereby impurities in water are removed through adsorption filtration, and whereby particle electrodes are formed through polarization of an electric field and assist electrochemical removal of nitrate and organic matters.

5. The biofilm electrochemical reactor for simultaneously removing nitrate nitrogen and trace organic matters in water of claim 1, wherein the first functional region is a pre-oxidation and carbon production region, the first cathode at the upper part is made of a stainless steel mesh, the upper part of the first anode is filled with the activated carbon fillers to form a three-dimensional anode structure, and the anode reaction in the first functional region is as follows: $C+2H_2O=CO_2+4H^++4e$, $H_2O=\frac{1}{2}O_2+2H^++2e$;
the cathode reaction is as follows: $2H_2O+2e=H_2+2OH^-$;
and the aerobic degradation reaction is $C_6H_5OH+7O_2=6CO_2+3H_2O$.

6. The biofilm electrochemical reactor for simultaneously removing nitrate nitrogen and trace organic matters in water of claim 1, wherein the second functional region is a hydrogen autotrophic denitrification region, the second functional region comprising the second cathode at the upper part and the activated carbon fillers, the second cathode is made of a stainless steel mesh, the stainless steel electrode rods extending to the activated carbon fillers layer are arranged on the surface of the second cathode, so that the contact area of the stainless steel electrode rods and the activated carbon is increased, and the contact and the electron transfer area between the second cathode and the autotrophic denitrification bacteria on the surface of the activated carbon fillers are increased, the reactions in the second functional region are: $2NO_3^-+5H_2=N_2+4H_2O+2OH^-$; $2H_2O+2e=H_2+2OH^-$.

7. The biofilm electrochemical reactor for simultaneously removing nitrate nitrogen and trace organic matters in water of claim 1, wherein the third functional region is a trace organic matter removal region and an oxygen generation region, the second cathode is below and the second anode is above, and with the action of an electric field, the surface of the second anode is discharged to generate $\cdot OH$ with strong oxidation effect, which can quickly oxidize to remove some trace organic pollutants in water, and the other trace organic pollutants are removed by the adsorption and degradation effects of the biofilm loaded on the activated carbon fillers; the anode reaction occurring in the third functional region is: $C_6H_5O+RuO_2(\cdot OH)=6CO_2+RuO_2+H^++e^-$; the cathode reaction is as follows: $2H_2O+2e=H_2+2OH^-$; the denitrification reaction is $2NO_3^-+5H_2=N_2+4H_2O+2OH^-$.

8. The biofilm electrochemical reactor for simultaneously removing nitrate nitrogen and trace organic matters in water of claim 1, wherein a specific process for simultaneously removing nitrate nitrogen and trace organic matters in water by using the biofilm electrochemical reactor is:
  (1) reactor starting: hydrogen autotrophic denitrifying bacteria are inoculated into the reactor, the inoculation process is: placing the cultured autotrophic denitrifying bacteria solution in a bacteria solution box for sealed storage, sequentially connecting to the bottom of a reactor through an inoculation pump and a water inlet valve, closing the water outlet valve, opening the return valve, and opening the inoculation pump for cyclic inoculation, simultaneously opening the power supply, adjusting the voltage of the reactor to be 24 V, removing the bacteria solution box and the inoculation pump 48 h after cyclic inoculation, and connecting the water inlet pipe to the water inlet valve;
  (2) reactor operation: after inoculation in the reactor is finished, the reactor enters an operation state, the water inlet valve and the water outlet valve are opened, the return valve is adjusted, micro-polluted raw water enters the lower part of the reactor, water flows upwards from bottom to top in the reactor, perform electrochemical pretreatment in the first functional region to remove part of the ammonia nitrogen and organic matters, then enter the second functional region to remove the nitrate nitrogen in the water by the autotrophic denitrifying bacteria, and finally enter the third functional region to oxidize and remove the trace organic matters in the water, a part of outlet water is discharged through the water outlet valve at the top of the reactor, the other part of outlet water is returned to the lower part of the reactor again through the return valve to be mixed with micro-polluted raw water, then uniformly distributed to the bottom of the reactor through the water distributor, gas generated by the reactor is discharged through the automatic exhaust valve, voltage in the whole operation process is supplied by the power supply and regulated with the voltage regulator; controlling the hydraulic retention time of the reactor to be 8-10 h, the current intensity to be 20-40 mA, the pH value of the micro-polluted raw water to be 6-8, and the nitrate nitrogen concentration to be 20-40 mg/L in the operation process; and
  (3) reactor maintenance: the activated carbon fillers of the reactor is supplemented and replaced through the filler adding hole and the electrodes of the reactor are replaced through an electrode mounting flange.

9. The biofilm electrochemical reactor for simultaneously removing nitrate nitrogen and trace organic matters in water of claim 8, wherein a cultivation process of the autotrophic denitrifying bacteria solution is: stirring 150 L of activated sludge from the denitrification section of a wastewater treatment plant for 15 min with a 160 r/min stirrer, then standing for 10 min to precipitate, taking 100 L of supernatant, then repeating the stirring and the precipitation operation for three times to obtain 50 L of bacterial solution, then diluted 1 time with 0.8% NaCl solution to prepare autotrophic denitrification bacterial solution required for the inoculation.

* * * * *